June 9, 1936.  E. S. JUDD  2,043,621
FLUID MIXER
Filed Dec. 24, 1934
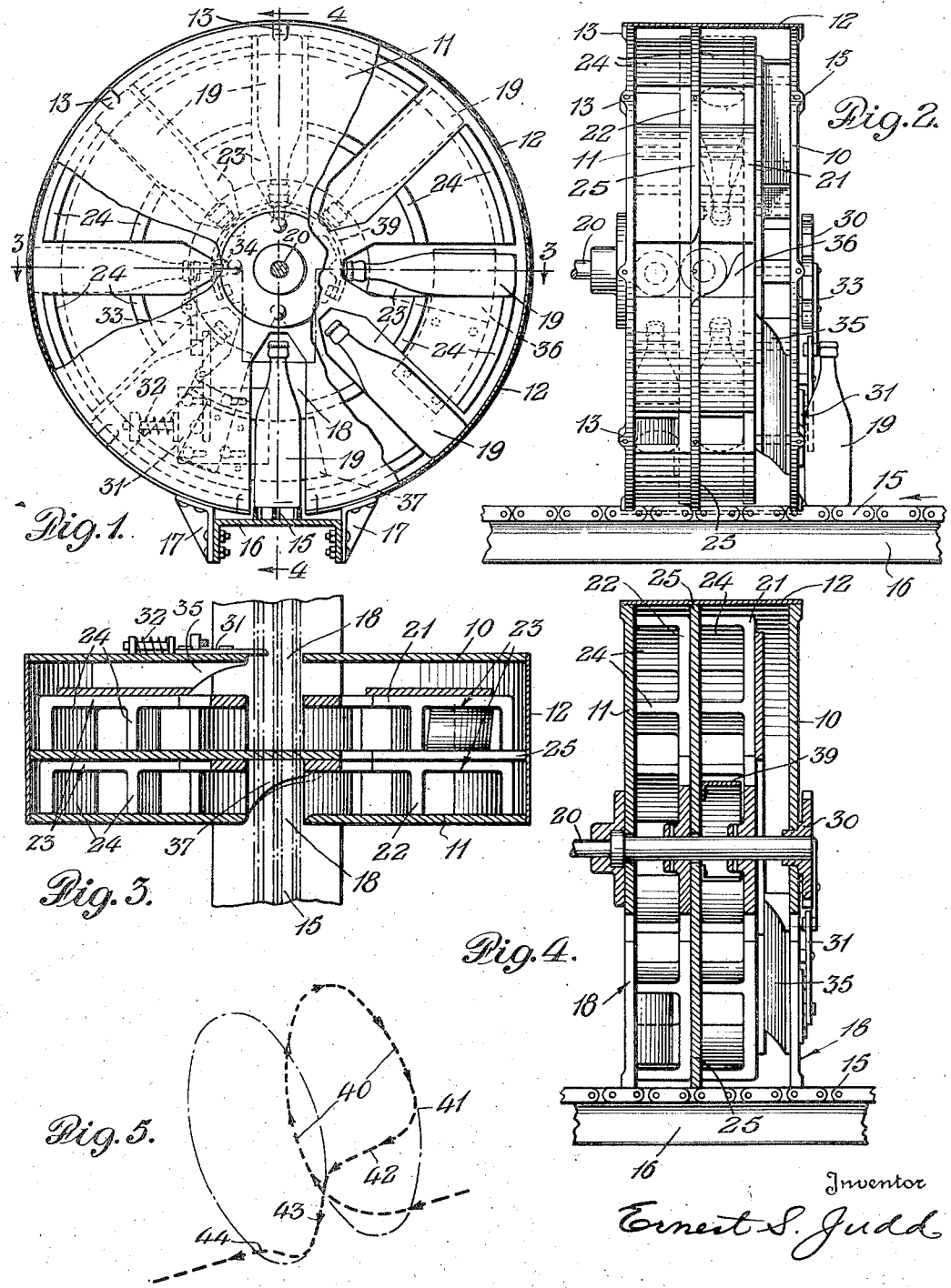
Inventor
Ernest S. Judd
By H. Yates Dowell
Attorney Patented June 9, 1936

2,043,621

UNITED STATES PATENT OFFICE 2,043,621

FLUID MIXER

Ernest S. Judd, Nashville, Tenn.

Application December 24, 1934, Serial No. 759,111

3 Claims. (Cl. 259—54)

This invention relates to apparatus for mixing fluids and particularly to apparatus for handling or inverting sealed containers for the purpose of effecting or promoting mixing of fluids contained therein.

It is an object of my invention to provide an improved apparatus of this character which is of simple construction and adapted for continued operation for considerable periods in actual use.

Another object of my invention is to provide an improved apparatus arranged to receive bottles or sealed containers from a traveling conveyor, invert the same to mix the contents and discharge the bottles or containers back upon the conveyor.

A still further object of my invention is to provide apparatus of the above character with an automatically controlled gate for feeding the bottles or containers from a conveyor to mixing or handling apparatus.

Other objects and advantages of my invention will become apparent from consideration of the embodiment thereof shown on the accompanying drawing, wherein Fig. 1 is an end elevational view of bottle inverting apparatus embodying the invention, certain parts being broken away to illustrate the construction more clearly;

Fig. 2 is a side elevational view of the apparatus shown in Fig. 1 with the side of the casing removed;

Fig. 3 is a horizontal sectional view taken on the line 3—3 of Fig. 1;

Fig. 4 is a vertical sectional view taken on line 4—4 of Fig. 1, and

Fig. 5 is a diagram illustrating the path taken by each bottle passing through the inverting apparatus.

Referring to the drawing, the preferred form of the apparatus comprises a casing or drum of substantially cylindrical shape and consisting of a flat front plate 10, a similar rear plate 11 and a curved cover plate member 12 secured to the members 10 and 11 as by bolts threaded into the lugs 13 and extending substantially around the entire periphery of plate members 10 and 11. The casing thus formed is secured in spaced relationship to a conveyor 15, for example a traveling chain or belt, by means of supporting member 16 and brackets 17 secured to said member and to the casing of the apparatus.

As shown the front and rear plate members 10 and 11 are provided with openings 18 registering with the conveyor 15 and through which bottles or sealed containers 19 are admitted to and discharged from the casing. The bottles 19 may contain a mixture of carbonated water and syrup which has been bottled by conventional apparatus and placed upon the conveyor 15 and the purpose of the apparatus illustrated in the drawing is to effect a more thorough mixing of the ingredients in said sealed containers.

A shaft 20 is journaled in the plate members 10 and 11 as shown in Fig. 4 and carries two disk-shaped supporting members 21 and 22 which are secured to the shaft 20 so as to rotate therewith. The shaft 20 is rotated at a suitable rate by means of a belt or other driving means not shown, preferably at a rate depending upon the rate of travel of the conveyor 15 and the number of containers 19 on said conveyor to be handled in any predetermined period. The rotatable supporting members 21 and 22 are provided with a series of radial openings 23 adapted to receive the bottles 19, as shown in Fig. 1. The supporting members 21 and 22 are further provided with lateral flanges 24 adapted to engage the sides of the bottles or containers to move the same as the supporting members are rotated by the shaft 20. An intermediate partition or plate member 25 is arranged between the supporting members 21 and 22, the supporting members being of similar character.

A cam member 30 is secured upon the front end of the shaft 20 and is arranged to control a plate member or gate 31 to prevent the feeding of a bottle 19 from a conveyor except when a predetermined point on the rotating member 21 is aligned with the opening 18 in the front plate so as to insure that the bottles will not be broken or jammed between the casing and the rotatable parts of the apparatus. A spring 32 is provided normally tending to move the plate member 31 to a position in which it obstructs the opening 18 in the front plate 10, the plate being withdrawn to a nonobstructing position by a lever 33 carrying a cam follower 34 which cooperates with the cam 30. Thus as the shaft 20 rotates, the gate 31 is alternately projected and withdrawn in order to insure the feeding of bottles 19 to the mixing apparatus in proper sequence.

When the gate 31 is withdrawn from in front of the opening 18, traveling conveyor 15 carries the bottle 19 through the opening in the front plate where the bottle is engaged by the rotatable member 21. The body portion of the bottle engages a stationary cam member 35 adjacent the inlet opening 18 whereby the bottle is positioned properly upon the supporting member. The bottom of the bottle rests upon the cover plate member 12 which forms a track upon which the bottle slides.

When the bottle has completed substantially three-fourths of its orbital movement around the shaft 20 it engages a second wedge-shaped cam member 36 shown in Figs. 1 and 2 which effects a transverse movement of the bottle through an aperture in the partition member 25 and into alignment with the second rotatable supporting member 22. As the bottle is further advanced by the rotation of the member 22 it engages the third stationary wedge-shaped cam member 37 (see Fig. 3) adjacent the discharge opening 18 in the plate member 11.

The cam member 37 insures discharging of the bottle from the casing of the mixing apparatus on the conveyor 15 by which it is conveyed to a packing or storing station.

It will be apparent that a simple and rugged construction of the rotatable supporting members is rendered possible by sliding the bottles upon the curved cover plate 12 as a track. When the bottles are raised above the lower half of the casing the lower ends thereof rest upon an arcuate guard plate 39 surrounding the central shaft 20 and serving as an auxiliary track for supporting the bottles.

The path taken by each container in passing through the mixing apparatus is shown diagrammatically in Fig. 5. The bottles are first rotated by the supporting member 21 through approximately three-fourths of a revolution as indicated by the line 40 until they engage the cam member 36 at the point 41. The bottles are then moved laterally as indicated by the line 42 onto the supporting member 22 by which they are carried, as indicated by the line 43 and discharged at the point 44 from the casing. If desired the supporting members and transfer cam 36 may be duplicated to effect more than one rotation of the bottles around the axis of the casing.

Other modifications of the embodiment shown and described for purpose of illustration will be apparent to those skilled in the art and are intended to fall within the scope of the invention if they are within the terms of the appended claims.

I claim:—

1. In combination with a traveling conveyor, a stationary casing overlying the conveyor, means within said casing for inverting bottles or containers on said conveyor and returning them thereto, a drive shaft for said means and means in front of said casing connected to said shaft for controlling feeding of bottles or containers to the casing.

2. In combination with a conveyor, a stationary casing having openings adjacent the conveyor, a rotatable shaft in said casing, means on said shaft for inverting bottles on the conveyor and returning them to the conveyor, a cam on said shaft and means controlled by said cam for controlling the feeding of bottles to the casing.

3. In combination with a conveyor, a stationary casing overlying the conveyor and having a front plate provided with an inlet opening in alignment with the conveyor, means in said casing for inverting the bottles or containers supported by the conveyor, a gate member carried by said front plate and means for operating said gate member in accordance with the position of said means relative to the inlet opening for controlling the feeding of bottles or containers into the casing.

ERNEST S. JUDD.